United States Patent Office 3,600,197
Patented Aug. 17, 1971

3,600,197
FLAVOR ENHANCING COMPOSITIONS FOR FOODS AND BEVERAGES
Herbert D. Spangler, Philadelphia, Pa., and Paul A. Hammes, Westfield, and Charles W. Everson, Martinsville, N.J., assignors to Merck & Co., Inc., Rahway, N.J.
No Drawing. Filed Aug. 27, 1968, Ser. No. 755,728
Int. Cl. A23l 1/22
U.S. Cl. 99—140
10 Claims

ABSTRACT OF THE DISCLOSURE

A composition in which stratification and segregation of the ingredients is retarded, without retarding the flowability thereof, for use in foods and beverages to improve flavor comprising a premix of salt with a blend of (a) an additive which is an edible glycerol or propylene glycol $C_{12}$ to $C_{18}$ fatty acid monoester, or acetylated derivatives thereof; and (b) a mixture of sodium glutamate with flavor enhancing 5'-nucleotides.

---

This invention relates to a flavor enhancing agent for foods and beverages. More particularly, this invention relates to a uniform premix of salt with a blend of (A) an additive which is an edible glycerol or propylene glycol $C_{12}$ to $C_{18}$ fatty acid monoester, or acetylated derivatives thereof; and (B) a mixture of monosodium glutamate and a flavor enhancing 5'-nucleotide.

It is known that the 5'-nucleotides such as disodium inosine-5'-monophosphate, (disodium-5'-inosinate), disodium guanosine-5'-monophosphate, (disodium-5'-guanylate) and particularly mixtures of the two, improve the flavor and taste of foods. Other 5'-nucleotides which likewise enhance the flavor and taste of foods include xanthosine-5'-monophosphate and uridine-5'-monophosphate.

The preferred 5'-nucleotides for use in this invention are disodium salts of inosine-5'-monophosphate or guanosine-5'-monophosphate, or mixtures thereof. These compounds are available commercially as separate products or in any desired ratios of mixture of the two. The commercial products have the appearance of colorless or white fine crystals, or of white crystal powders which are 99% pure and have a moisture content of approximately 25–30%. The compounds have hardly any moisture absorbing properties and can be stored for any reasonable period of time without deterioration under normal conditions. A synergistic effect is obtained when the two 5'-nucleotides are used together.

The monosodium glutamate is likewise a commercial product which is sold in large quantities to the food industry to improve the over-all palatability of a great many foods.

When a mixture of the disodium salts of inosine-5'-monophosphate and guanosine-5'-monophosphate is blended with varying ratios of monosodium glutamate the flavor is enhanced to a degree that neither product alone can obtain. The flavor effect will vary according to the concentration of salt, monosodium glutamate and/or 5'-nucleotide naturally contained in the foods.

When used with food such as meat products, soups, vinegar, various dressings, sauces, curry powder, or alcoholic beverages such as wine or certain whiskeys, these compounds tend to reduce the sour and bitter taste qualities and enhance or increase the sweet and salt flavor qualities of the food or beverages. When used for foods or beverages containing no amino acids, it is more effective to add monosodium glutamate and the 5'-nucleotides together. The 5'-nucleotides may also be employed to enrich specifically the seasonings containing amino acids. Alakli metal salts of 5'-nucleotides also may be employed similarly as the free 5'-nucleotides since there is no significant difference in their flavor action.

When the 5'-nucleotides are used for various processed foods, appropriate blend ratios are determined by such factors as the type of foods (particularly whether they are meat or vegetable foods), grade, degree of freshness and proportions of the raw materials and basic condiments that are to be used in the processing. However, since the 5'-nucleotides are very effective flavor enhancers which bring out the original flavor of each raw material to the maximum, they minimize the slight differences which might exist in the raw materials to be processed. Thus the 5'-nucleotides contribute to quality control of the processing to give a standardized uniform product.

When the above mentioned 5'-nucleotides are combined with monosodium glutamate for superior seasoning effects, the usual blending ratios of the monosodium glutamate with these 5'-nucleotides is within the range of 12:1 and 50:1.

The threshold values (minimum concentration in which taste is perceptive) of inosine-5'-monophosphate and guanosine-5'-monophosphate is 25/100,000 and 12.5/100,000 respectively, while with the monosodium glutamate the threshold value is 30/100,000. Although the flavor of monosodium glutamate becomes stronger in proportion to its concentration, the flavor of the 5'-nucleotide does not follow such a proportionate pattern. When inosine-5'-monophosphate and guanosine-5'-monophosphate are used together, stronger taste sensation can be achieved by a synergistic effect than when either one is used alone.

The mixtures of monosodium glutamate and the 5'-nucleotides are generally sold directly to food processors such as packers, canners or bottlers. The small concentrations to be employed make it impractical to sell these mixtures directly to the consumer for household consumption. Accordingly, it is advantageous to employ the compounds in the form of a concentrated premix containing a small amount of salt, which premix is to be sold to the food processors or packers. Final compositions for the consumer are then prepared by blending together suitable amounts of premix with an additional amount of salt, say one part of the former to nine parts of the latter. The ratio of the premix to salt or other ingredients can vary within wide limits. However, if the ingredients are merely mixed together, segregation and stratification of the ingredients result in both the premix and the final product, making it difficult to maintain a uniform blend.

It has now been uniquely discovered that a premix can be prepared which is white, crystaline, free from visible evidence of contamination, and suggestive of table salt by treating a blend of the monosodium glutamate and the 5'-nucleotides with a small amount of an additive which is an edible glycerol or propylene glycol $C_{12}$ to $C_{18}$ fatty acid monoester, or acetylated derivatives thereof. An additive suitable for this purpose must not be subject to rancidity on standing, and must be accepted for food use in the concentrations employed.

In a preferred embodiment of this invention a higher fatty acid monoglyceride, which may be acetylated or non-acetylated, is used. The monoglycerides which are sold in commerce, are generally obtained by the partial saponification of naturally occurring fats. Thus the higher fatty acid present is generally oleic acid, palmitic acid, stearic acid, or mixtures thereof, depending on the natural product from which it is derived. For the purposes of this invention a distilled diacetylated monoglyceride, such as that derived from cottonseed oil, is preferred. This product has a low congeal point (approximately 1° C.), a relatively low viscosity, and excellent lubricating properties. This product is used as an additive for blending together the monosodium glutamate and the 5′-nucleotides. The preferred concentration is about 0.04% to 4% by weight of the additive with respect to the combined weights of the monosodium glutamate and the 5′-nucleotides. Distilled or nondistilled fatty acid monoglycerides can also be employed as additives in approximately the same concentration, but at a temperature above the melting point of the monoglyceride, suitably within the temperature range of 125° C. to 175° C. It is an advantage of this process that the 5′-nucleotides are highly stable and remain stable at these temperatures.

The higher fatty acid monoglycerides are plastic fats with a low softening point. The commercial products have a congeal point within the range of about 29° C. to about 70° C. The products are made from natural vegetable and animal oils and fats such as cottonseed oil, safflower oil, lard, and hydrogenated derivatives thereof, as well as from USP oleic acid or triple pressed stearic acid. They are concentrated to about 90% total monoester content and are unusually stable against oxidation and against loss of monoester content.

The acetylated monoglycerides are derived fats in which acetic acid is one of the acids present. The commercial products are monoglycerides in which approximately one-half, two-thirds, or all of the free hydroxyl groups have been acetylated. They range from nearly colorless liquids with a congeal point of about 1° C. to solids with a congeal point up to about 46° C. The source fat used in their preparation are natural vegetable and animal fats such as cottonseed oil or lard, and hydrogenated derivatives thereof.

The propylene glycol monoesters are commercial products derived from propylene glycol and animal or vegetable oil, for example hydrogenated soybean oil. The latter product has a 90% monoester content, a melting point of 44–46° C., and is usually stable against oxidation.

Without being limited to any theory of action, it is pointed out that the additives which have been found most useful for blending together the monosodium glutamate and 5′-nucleotide with the sodium chloride contain adjacent dihydroxy groups:

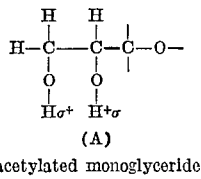

(A)
acetylated monoglyceride

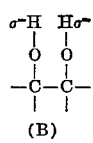

(B)
Dihydroxy group of ribose portion of the 5′-nucleotide

Here the ribose portion of the nucleotide likewise contains a dihydroxy group. The structures, therefore, are conducive to hydrogen bonding, that is to say, a physical bonding which will release in water.

Another possible explanation is concerned with surface activity, that is, wetting of the substrate resulting in adhesion to the surface. Whatever the reason, the result is that the use of the above named additives gives a blended material which can be mixed with salt so as to retard stratification and segregation, without retarding flow, in both the premix and the final consumer product. Accordingly, this procedure provides a means of maintaining a uniform blend of materials which heretofore could not be held as such.

As is well known, the salt of commerce usually contains additional ingredients such as calcium and magnesium chlorides or sulfates which absorb moisture that otherwise makes the salt cake. Conditioners such as magnesium carbonate or calcium polysilicate are also commonly added so as to maintain the salt in a non-aggregate, free-flowing condition even during severe conditions of storage and use. Salt may also be mixed with a calcium polysilicate conditioner for dispersing by an electrostatic salter, since calcium polysilicate, unlike other conditioners such as tricalcium phosphate, readily accepts an electrostatic charge. Food grade antioxidants such as butylated hydroxyanisole, alone or in combination with propyl gallate and citric acid, may also be added with the polysilicate conditioner to obtain a greater degree of flavor stability in foods susceptible to oxidative rancidity, for example, foods possessing a relatively unstable fat content. Extra fine salt which is prepared by micropulverizing high purity vacuum pan salt to less than 200 mesh particle size (74 microns) normally requires calcium polysilicate as an added conditioner to prevent caking and to maintain flowability.

In the alternative, food grade salt may be chemically treated to remove objectionable calcium and magneisum impurities that can adversely affect the color, flavor, texture and brine clarity of food products. The pro-oxidant potential, associated with most grades of salt, may be drastically reduced by removing active pro-oxidant heavy metals with a sequestrant.

Salt crystals are normally cubical in structure and uniform in size. Commercial grades of food grade salt are obtainable in uniform and consistent particle size and bulk density ensuring uniform distribution in dry blending operations. Dendritic crystals of salt are produced by chemically pretreating brine with yellow prussiate of soda. Unlike the cubical structure of regular vacuum pan (granulated) salt, or the relatively flat crystal aggregates of flake type salt, dendritic crystals are branched or starlike in basic form. The finished product has a uniform shape and demonstrates rapid flow properties similar to granulated salt, yet has a relatively low apparent density, and high specific surface area, like flake salt.

It is an advantage of this invention that food grade salt in any of the above described varieties or crystalline forms may be used in preparing the premix. Generally it is preferred to use in the premix the same grade of salt with which the premix is to be later diluted.

According to one further embodiment of this invention there is provided a dry, uniform, flavor enhancing composition for consumer use in foods or beverages, which composition includes a small amount of the premix as described above and a food grade salt. The amount of premix is adjusted so that there is provided in the final composition for the consumer a product containing from about 25% to 75% of monosodium glutamate, and about 1% to 10% of one or more of the above described 5′-nucleotides, based on the total weight of the composition.

The following examples are given for the purpose of illustration and not by way of limitation.

EXAMPLE 1

Formula for premix:

| | G. |
|---|---|
| Monosodium glutamate | 475.00 |
| Mertaste® | 25.00 |
| Myvacet® | 2.00 |
| Sodium chloride (salt—food grade) | 500.00 |

Mertaste® is a mixture of 50% disodium inosinate and 50% disodium quanylate. It is a colorless or white crystal powder with a moisture content of not more than 28.5%. An aqueous solution of 1 g. in 20 ml. has a pH of 7.0–8.5.

Myvacet® 9–85 is a distilled diacetylated monoglyceride prepared from cottonseed oil which complies with the food additive regulations Section 121:1018 for acetylated monoglycerides. It is a clear, very slightly yellow liquid which has the following properties.

Typical physical properties:
 Physical state—Clear, very slightly yellow liquid.
 Congeal point—1° C. (34° F.) (approx.)
 Refractive Index—1.451 (40° C: 104° F.)
 Viscosity at:
  20° C. (68° F.)—47 cps.
  50° C. (122° F)—18 cps.
Typical physical properties:
 Specific gravity at:
  20° C. (68° F.)—0.98
  50° C. (122° F.)—0.96
 Solubility at:
  20° C.—Soluble in all common organic solvents, 80% w./w. aqueous ethanol, and vegetable and mineral oil. Less than 4% in 70% alcohol.
Typical chemical properties:
 Iodine value—70
 Saponification value—380
 Monoglyceride—0 to 2%
 Reichert-Miessel value—145
 Acid value—Less than 4

Procedure

The monosodium glutamate is mixed with Mertaste® in a model N–50 Hobart Mixer for 10 minutes at 139 r.p.m., using a flat beater. The Myvacet® is then blended in the mixture of monosodium glutamate and Mertaste® for an additional 10 minutes. Salt is then blended into the mixture for an additional 15 minutes. The product is a uniform premix which will mix with granulated salt in a 9:1 dilution without segregation or stratification.

In accordance with the above procedure, but using only 0.2 g. of Myvacet®, a uniform premix is likewise obtained. Following above procedure, but using dendritic or flake salt, in place of granulated salt, the premix obtained can be further diluted with the same type of salt without stratification or segregation, and remain free flowing.

EXAMPLE 2

Formula for premix: G.
 Monosodium glutamate _____ 475.00
 Mertaste® _____ 25.00
 Myverol® 18–85 _____ 2.00
 Sodium chloride (salt—food grade) _____ 500

Mertaste® has the composition indicated in Example 1. Myverol® 18–85 is a distilled monoglyceride having the following average chemical and physical properties:

Monoester content—90.0% (minimum)
Saponification value—155–165
Iodine value—85
Glycerol content—1.5% (maximum)
Free fatty acids (as oleic)—1.5% (maximum)
Specific gravity—0.92 at 80° C.
Congeal point—46° C. (115° F.)
Clear point—56° C. (133° F.)

Procedure

The monosodium glutamate and Mertaste® are mixed with a model N–50 Hobart Mixer at 139 r.p.m. in a stainless steel pot at 150° C. for 10 minutes. The Myversol®, previously heated to 150° C., is slowly added and blended in the mixture of monosodium glutamate and Mertaste® for an additional 10 minutes. Salt, preheated to 150° C., is then blended into the mixture for 20 minutes and the finished product allowed to cool to room temperature. The product is a uniform premix which will mix with salt in a 9:1 dilution without segregation or stratification, and remain free flowing.

In accordance with the above procedure, but using 20 g. of Myverol®, a uniform premix is likewise obtained.

EXAMPLE 3

Formula for premix: G.
 Monosodium glutamate _____ 475.00
 Mertaste® _____ 25.00
 Myverol® P–06 _____ 2.00
 Sodium chloride (salt—food grade) _____ 500

Mertaste® has the composition indicated in Example 1. Myverol® P–06 is a propylene glycol monoester prepared from hydrogenated soybean oil and propylene glycol and has the following technical properties:

Hydroxyl value—170
Saponification value—165
Melting point—44 to 46° C.
Congeal point—45° C.
Acid value—2 max.
Peroxide value—1 max.
Free glycerol and propylene glycol—1% max.

Procedure

The monosodium glutamate and Mertaste® are mixed with a Model N–50 Hobart Mixer at 139 r.p.m. in a stainless steel pot at 150° C. for 10 minutes. The Myverol®, previously heated to 150° C., is slowly added and blended in the mixture of monosodium glutamate and Mertaste® for an additional 10 minutes. Salt, preheated to 150° C., is then blended into the mixture for 20 minutes and the finished product allowed to cool to room temperature. The product is a uniform premix which will mix with salt in a 9:1 dilution without segregation or stratification, and remain free flowing.

Various changes and modifications in the procedures herein disclosed will occur to those skilled in the art, and to the extent that such changes and modifications are embraced by the appended claims, it is to be understood that they constitute part of our invention.

We claim:
1. A composition in which stratification and segregation of the ingredients is retarded, without retarding the flowability thereof, comprising a premix of sodium chloride with a blend of:
 (a) About 0.04 to 4% by weight of an additive which is an edible glycerol or propylene glycol $C_{12}$ to $C_{18}$ fatty acid monoester, or acetylated derivatives thereof; and
 (b) A mixture of monosodium glutamate with flavor enhancing 5′-nucleotides, the weight proportion of said glutamate to said 5′-nucleotide being within the range of about 12:1 and 50:1.
2. The premix of claim 1 wherein said additive is an acetylated glycerol fatty acid monoester.
3. The premix of claim 2 wherein said additive is a distilled completely acetylated fatty acid monoester derived from cottonseed oil, and having a congeal point of about 1° C.
4. The premix of claim 1 wherein said additive is a distilled monoglyceride derived from cottonseed oil and having a congeal temperature of about 46° C., and a monoester content of at least 90%.
5. The premix of claim 1 wherein said 5′-nucleotide is disodium inosine-5′-monophosphate, disodium guanosine-5′-monophosphate, or a mixture of the two nucleotides.
6. The premix of claim 1 where said sodium chloride is a food grade salt.
7. A process for preparing the premix of claim 1 which comprises the steps of:
 (a) mixing monosodium glutamate with disodium inosine-5′-phosphate and/or disodium guanosine-5′-phosphate in the weight proportions of 12:1 to 50:1;
 (b) blending into the mixture of step (a) 0.04% to 4% by weight of an additive which is an edible glycerol or propylene glycol $C_{12}$ to $C_{18}$ fatty acid monoester, or acetylated derivative thereof, and

(c) blending a food grade salt into the product of step (b);
wherein the temperature during blending in steps (b) and (c) is maintained above the melting point of said additive.

8. The process of claim 7 wherein said additive is completely acetylated fatty acid monoester derived from cottonseed oil, and the process is carried out at room temperature.

9. The process of claim 7 wherein said additive is a distilled monoglyceride having a congeal temperature above 40° C., and wherein said additive in step (b) and said salt in step (b) are each preheated to about 140° C.–160° C. before blending.

10. The premix of claim 1 wherein said additive is a propylene glycol monoester.

References Cited

UNITED STATES PATENTS 3,082,154  3/1963  Allan _____ 99—143X
3,389,000  6/1968  Fujita et al. _____ 99—140

MORRIS O. WOLK, Primary Examiner

W. R. BOVEE, Assistant Examiner

U.S. Cl. X.R.

99—143